(12) United States Patent
Childs et al.

(10) Patent No.: US 6,789,012 B1
(45) Date of Patent: *Sep. 7, 2004

(54) PDA SYSTEMS, FUNCTIONAL DATA, AND METHODS FOR GENERATING A ROUTE

(75) Inventors: Michael E. Childs, Overland Park, KS (US); Darin J. Beesley, Overland Park, KS (US)

(73) Assignee: Garmin Ltd. (KY)

( * ) Notice: Subject to any disclaimer, the term of this patent is extended or adjusted under 35 U.S.C. 154(b) by 0 days.

This patent is subject to a terminal disclaimer.

(21) Appl. No.: 10/269,530

(22) Filed: Oct. 11, 2002

Related U.S. Application Data

(63) Continuation-in-part of application No. 10/032,033, filed on Dec. 21, 2001.

(51) Int. Cl.[7] .............................................. G01C 21/34
(52) U.S. Cl. .................... 701/209; 701/211; 340/995.19
(58) Field of Search .............................. 701/208, 209, 701/211; 340/995.19; 707/104.1

(56) References Cited

U.S. PATENT DOCUMENTS

| | | | |
|---|---|---|---|
| 5,953,722 A | 9/1999 | Lampert | 707/100 |
| 6,121,314 A | 9/2000 | Richter | 514/481 |
| 6,192,314 B1 * | 2/2001 | Khavakh et al. | 701/209 |
| 6,259,988 B1 * | 7/2001 | Galkowski et al. | 701/202 |
| 6,285,951 B1 * | 9/2001 | Gaskins et al. | 701/209 |
| 6,317,684 B1 | 11/2001 | Roeseler | 701/202 |
| 6,317,687 B1 | 11/2001 | Morimoto | 701/211 |
| 6,321,158 B1 | 11/2001 | DeLorme | 701/201 |
| 6,388,877 B1 * | 5/2002 | Canova et al. | 361/686 |
| 6,477,526 B2 * | 11/2002 | Hayashi et al. | 707/4 |
| 6,526,351 B2 * | 2/2003 | Whitham | 701/211 |

FOREIGN PATENT DOCUMENTS

| | | | |
|---|---|---|---|
| JP | 10-132594 | * | 5/1998 |

OTHER PUBLICATIONS

Oberhauser et al.; Fast data structures for shortest path routing: a comparative evaluation; 1995 IEEE Intl. Conf. on Gateway to Globalization; Jun. 1995; vol. 3, pp. 1597–1601.*

"An Optical pathfinder for vehicles in real–world digital terrain maps", http://www.nease.net/jamsoft/shortestpath/pathfinder/4.html, (1999), 11 pages.

"Informed Search Methods", *Artificial Intelligence, A Modern Approach*, Prentice Hall, Inc., (1995), 92–115.

"Real–Time Vehicle Routing in Dynamic and Stochastic Urban Traffic Networks", http://www.gpu.srv.ualberta.ca/lfu/research.htm, (1997), 1–3.

Ahuja, R., "Faster Algorithms for the Shortest Path Problem", *Journal of the Association for Computing Machinery, 37(2)*, (1990), pp. 213–223.

Cung, V., et al., "An Efficient Implementation of Parallel A*", *CFPAR*, Montreal, Canada, (1994), pp. 153–167.

Fredman, M., "Fibonacci heaps and their uses in improved network optimization algorithms", *Journal of ACM*, (1987), 2 pages.

(List continued on next page.)

*Primary Examiner*—Michael J. Zenelli
(74) *Attorney, Agent, or Firm*—Devon A. Rolf

(57) ABSTRACT

PDA devices, systems, functional data and methods are provided for an improved route generation. A PDA with route generation capabilities includes a processor communicating with a memory. The memory includes a current location of the PDA, one or more available locations, and a destination of the PDA. A display communicates with the processor and is capable of communicating at least a portion of a generated route for the PDA. Available locations are repetitively inspected and locations adjacent to a last selected location are inserted into a first data structure such that the first location of the first data structure is always a least cost location associated with all adjacent locations comprising the first data structure. The first location is then optionally inserted into a second data structure. The generated route includes the current location, one or more first locations, and the destination.

29 Claims, 11 Drawing Sheets-

OTHER PUBLICATIONS

Fu, L., "Heuristic Shortest Path Algorithms and their Potential IVHS Applications", *Proceedings of the 4th University of Alberta—University of Calgary, Joint Graduate Student Symposium in Transportation Engineering,* (1995),pp. 83–109.

Ikeda, T., "A Fast Algorithm for Finding Better Routes by AI Search Techniques", *Vehicle Navigation and Information Systems Conference Proceedings,* (1994),pp. 291–296.

Kaindl, H., "Memory–Bounded Bidirectional Search", *Proceedings of the 12th National Conference on Art,* AAAI Press, Seattle WA,(1994),pp. 1359–1364.

Laporte, G., "The Vehicle Routing Problem: An Overview of Exact and Approximate Algorithms", *European Journal of Operational Research, 59,* (1992),pp. 345–358.

Myers, B. "Data Structures for Best–First Search", http://www.4.ncsu.edu/jbmyers/dsai.htm, (1997),pp. 1–6.

Ronngren, R., et al. ,"Parallel and Sequential Priority Queue Algorithms", *ACM Transactions on Modeling and Computer Simulation,* (1997),pp. 168–172, 198,199.

Stout, B., "Smart Moves: Intelligent Pathfinding", *Gamasutra* http://gamasutra.com/features/prgramming/080197/pathfinding.htm, (1997),pp. 1–11.

Wai, Leong.H., et al., "Comparative Study of Shortest Path Algorithm for Transport Network", *USRP Report 2,* (1999), pp. 1–10.

Zhan, F., "Three Fastest Shortest Path Algorithms on Real Road Networks: Data Structures and Procedures", *Journal of Geographic Information and Decision Analysis,* (1997), 11 pages.

Zhao, Y., "An Adaptive Route–Guidance Algorithm for Intelligent Vehicle Highway Systems", *American Control Conference,* Boston, MA,(1991),pp. 2568–2573.

* cited by examiner

PDA SYSTEMS, FUNCTIONAL DATA, AND METHODS FOR GENERATING A ROUTE

CROSS-REFERENCE TO RELATED APPLICATIONS

This application is a continuation-in-part of U.S. application Ser. No. 10/032,033, filed Dec. 21, 2001, the specification of which is incorporated herein by reference.

FIELD OF THE INVENTION

The present invention relates generally to navigational devices, and in particular to PDA systems, functional data, and methods which use optimal data structures and methods to generate a route plan.

BACKGROUND OF THE INVENTION

Route planning devices are well known in the field of navigational instruments. The method of route planning implemented by known prior art systems depends on the capabilities of system resources, such as processor speed and the amount and speed of memory. As increased system capability also increases system cost, the method of route planning implemented by a navigation device is a function of overall system cost.

Generally, with a navigational aid device, cartographic data is loaded into a memory of the device and manipulated to provide route planning to a user of the device. Selecting the optimal route can be processor and memory intensive since a variety of thoroughfare names, thoroughfare classifications, geographic distances between thoroughfares, time estimates between thoroughfares, and the like must be rapidly processed to provide near instantaneous route planning information to the user of the device. Moreover, as the memory and the processor performance demands increase to provide an acceptable level of processing throughput, the navigational device becomes more expensive for the user to purchase. Additionally, the physical dimensions of the device may increase and correspondingly the portability and attractiveness of the device becomes less appealing to the user.

Additionally, when a navigation device deviates from a provided route plan, the device preferably responds rapidly respond by projecting a new route plan which must be communicated to the user of the device quickly. Otherwise unless the device is completely stopped for some period of time, the device could deviate farther from the projected new route and the device could be rendered useless to the user. Of course, stopping may not be practical when the device is being used within a vehicle on the roadways.

Clearly, in many cases halting travel is not a viable alternative. For example, when the user is traveling on an interstate it is entirely impossible to simply stop. The alternative of pulling off on the shoulder is undesirable and can be dangerous. Pulling off on an exit is equally undesirable since doing so increases travel time and provides an added inconvenience to the user. In other instances, such as navigating downtown city streets, the traffic issues alone may prevent the user from stopping their vehicle during the recalculation process. Even if the user has the ability to safely stop their vehicle, such as when traveling in a neighborhood, the inconvenience factor is present. Accordingly, it is vitally important for the device to rapidly and often repetitively calculate a dynamic route plan for the device to reach a desired destination. To achieve this result, efficient memory and processor performance are critical.

A variety of techniques addressing a subset of the problem have attempted to alleviate memory and processor bottlenecks, such as requiring the user to load into the device's memory a selected geographic region by connecting the device to a remote storage having a desired region or by requiring the user to connect the device to a computing device and download the desired region from a remote location. Yet, cartographic data are voluminous and even with reduced region selections, current devices require substantial memory to efficiently generate a route plan for a user. Typically, to generate a route plan with a reasonable processor there must be at least 500 kilobytes of available random access memory (RAM), but more likely 2 megabytes or more of available RAM can be required.

In summary, current prior art systems have created a spectrum of products in which the processing throughput of the products is directly related to the capacity of the available RAM of the products. Further, as users demand products with greater functionality the problem continues to escalate proportionally. As a result, products are costly and becoming less portable due to an increase in their physical size.

Therefore, there exists a need for a navigational route planning device which is more efficient and accurate than current systems, without requiring the more expensive system resources, such as increased RAM capacity. In addition, there is also a need for a navigational route planning device which rapidly and efficiently generates a route plan.

SUMMARY OF THE INVENTION

The above mentioned problems of navigational devices are addressed by the present invention and will be understood by reading and studying the following specification. Devices, systems, functional data, and methods are provided for a navigational route planning device which is more efficient and accurate than current systems, without requiring the more expensive system resources and increased requirements of memory. The devices, systems, functional data, and methods of the present invention offer an improved navigational route planning device which is capable of rapidly generating a more efficient route plan with minimal memory and processor requirements.

In one embodiment of the present invention, a navigational device is provided having a processor, a memory in communication with the processor, and a display in communication with the processor. The device dynamically generates a route path, using the processor and the memory, from a moveable location associated with the device to a destination of the device by repetitively and dynamically expanding one or more adjacent locations and inserting the expanded adjacent locations into a first data structure. At various points in time, one or more first locations of the first data structure will include a then existing least cost location in the route path. The route path is dynamically generated from the moveable location, the first locations of the first data structure, and the destination. Further, at least a portion of the route path is communicated to the display.

In another embodiment of the present invention a navigation system is provided having a mass storage device adapted to store navigation data, a server adapted to communicate with the mass storage; and a navigation device adapted to communicate with and retrieve navigation data from the server via a communication channel, wherein the navigation device includes a processor in communication with a memory. Furthermore, the processor and the memory cooperate to generate a projected route from a starting location, one or more available locations, and an ending location. Each available location has an associated cost. Moreover, each available location is evaluated as the projected route is constructed, if an available location is adjacent to a last inserted available location and has a least cost when compared to costs associated with all available adjacent locations. The adjacent locations are inserted into a first data structure such that a first location of the first data structure is a least cost location of the data structure.

In still another embodiment of the present invention, functional data to select an optimal route is provided. The functional data include a beginning node representative of an initial geographic location, a destination node representative of a desired geographic location, and an optimal route, wherein the optimal route is a path starting with the beginning node and including one or more selected intermediate nodes and ending with the destination node. Moreover, the functional data include one or more available nodes, wherein each available node has a cost associated with the art of including each available node in the path as one of the selected intermediate nodes. Further, as one or more of the available nodes become available for inspection, the available nodes are organized as a first data structure wherein a least cost available node is a first node of the data structure.

In yet another embodiment of the present invention a method for generating a projected route is provided wherein an initial starting location and an ending location are received and one or more available locations existing between the starting location and the ending location are identified. Moreover, a first evaluation is initiated by beginning with the starting location and proceeding to the ending location and selecting one or more adjacent locations from the available locations. As one or more of the adjacent locations are selected, each of the selected adjacent locations are inserted into a first data structure such that a first location of the first data structure is always associated with a least cost location of the first data structure. Further, the projected route is generated from the starting location, one or more of the selected adjacent locations, which occupy the first location of the first data structure, and the ending location.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE INVENTION

In the following detailed description of the invention, reference is made to the accompanying drawings which form a part hereof, and in which is shown, by way of illustration, specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense, and the scope of the present invention is defined only by the appended claims, along with the full scope of equivalents to which such claims are entitled.

The present invention is drawn to navigational systems and devices having route generation capabilities. One type of navigational system includes Global Positioning Systems (GPS). Such systems are known and have a variety of uses. In general, GPS is a satellite-based radio navigation system capable of determining continuous position, velocity, time, and in some instances direction information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometrical triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users.

In fact, although GPS enabled devices are often used to describe navigational devices, it will be readily appreciated that satellites need not be used at all to determine a geographic position of a receiving unit, since cellular towers or any customized transmitting radio frequency towers can be deployed and combined in groups of three or more. With such a configuration, any standard geometric triangulation algorithm can be used to determine the exact location of the receiving unit. In this way, personal hand held devices, cell phones, intelligent appliances, intelligent apparel, and others can be readily located geographically, if appropriately equipped to be a receiving unit.

Figure 1:
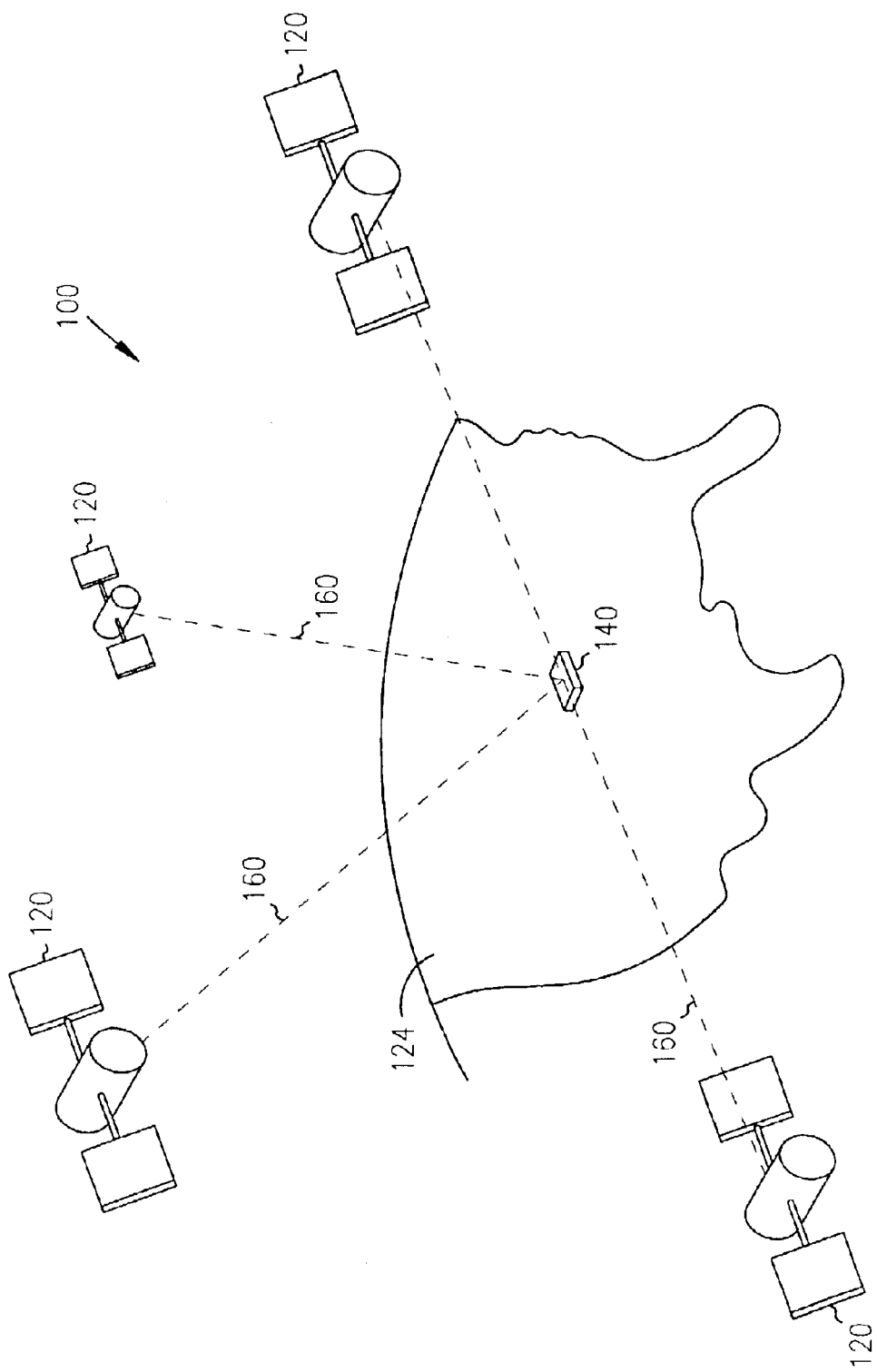
FIG. 1 is a representative view of a Global Positioning System (GPS)

FIG. 1 shows one representative view of a GPS denoted generally by reference numeral 100. A plurality of satellites 120 are in orbit about the Earth 124. The orbit of each satellite 120 is not necessarily synchronous with the orbits of other satellites 120 and, in fact, is likely asynchronous. A GPS receiver device 140 of the present invention is shown receiving spread spectrum GPS satellite signals 160 from the various satellites 120.

The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

Of course as previously presented and as is readily appreciated by those skilled in the art, GPS satellites and GPS receiving devices are not required by the tenets of the present invention, since any receiving device capable or receiving the location from at least three transmitting locations can perform basic triangulation calculations to determine the relative position of the receiving device with respect to the transmitting locations.

For example, at least three cellular towers can each transmit their location information to a receiving cellular phone, or any other receiving device, and if the phones or devices are equipped to perform the triangulation algorithm, then the location of the cellular phone or device can be readily resolved. By further way of example, an amusement park or entertainment facility can deploy three or more transmitting radio frequency devices and provide users with receiving units capable of performing a triangulation algorithm to determine the receiving units location within the amusement park or entertainment facility. In this way, it is readily apparent that a receiving unit need not be exclusively GPS enabled to benefit from the teachings of the present invention.

Figure 2A:
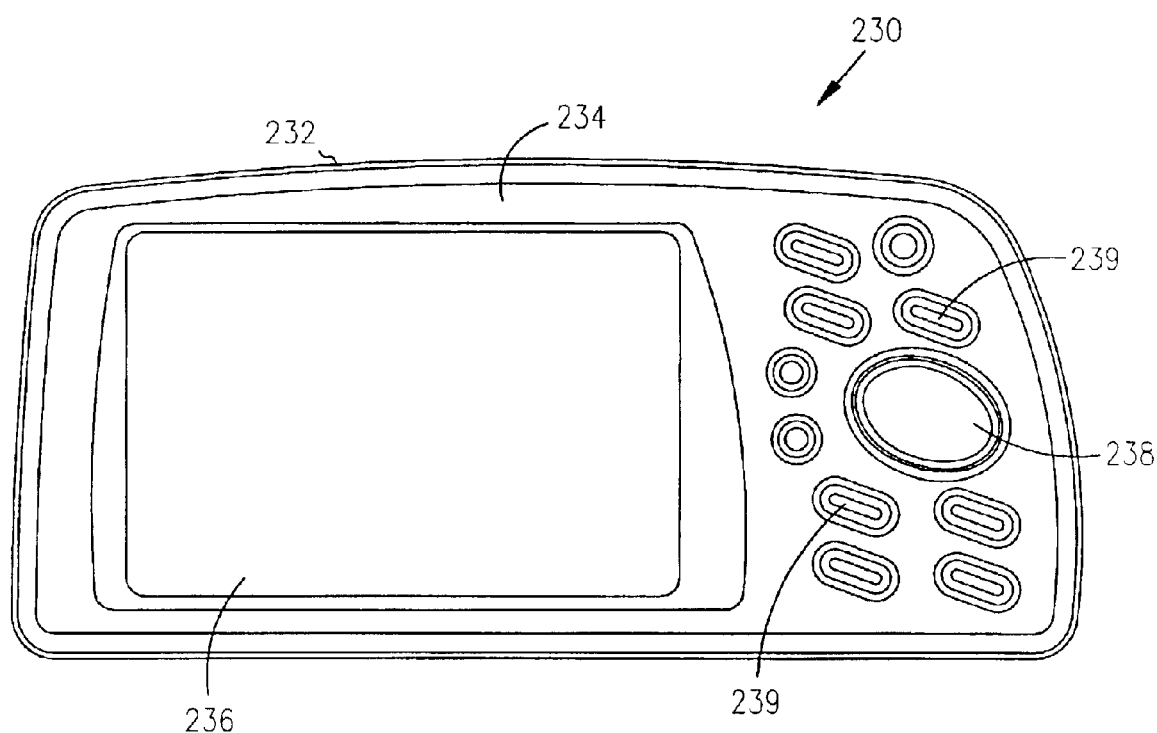
FIGS. 2A and 2B illustrate views for one embodiment of an electronic navigational device according to the teachings of the present invention.
Figure 2B:
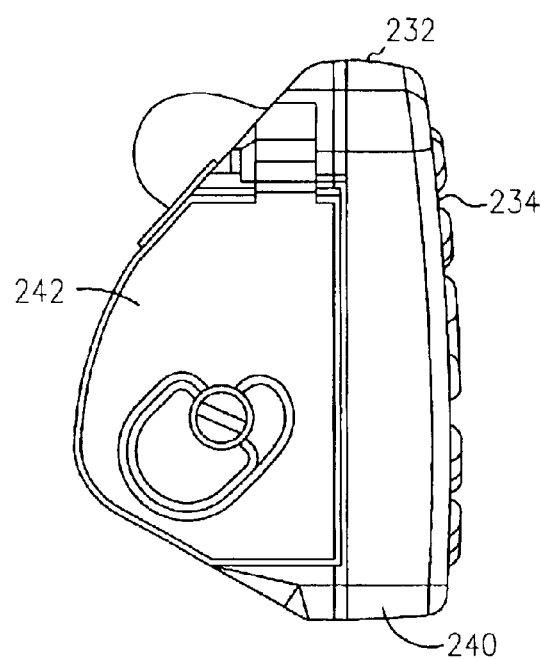

FIGS. 2A and 2B illustrate views for one embodiment of an electronic navigational device 230 according to the teachings of the present invention. As one of ordinary skill in the art will understand upon reading this disclosure, the device can be portable and can be utilized in any number of implementations such as automobile, personal marine craft, and avionic navigation. Moreover, the device can be used independent of any vehicle or craft such as, and by way of example only, a pedestrian using the device for navigation.

In FIG. 2A a front view of one embodiment 230 is provided showing the navigational device having a generally rectangular housing 232, which is constructed of resilient material and has been rounded for aesthetic and ergonomic purposes. As shown in FIG. 2A, a control face 234 has access slots for an input key pad 238, other individual keys 239, and a display screen 236. In one embodiment, the display screen 236 is a LCD display which is capable of displaying both text and graphical information. The invention, however, is not so limited.

In FIG. 2B, a side view of the navigational device 230 is provided. FIG. 2B illustrates that the device's housing 232 is defined by an outer front case 240 and a rear case 242. As shown in FIG. 2B, the outer front case 240 is defined by the control face 234. In the embodiment shown in FIG. 2B, the outer front case 240 and the rear case 242 are made of one molded piece or separate molded pieces to form the device housing 232 and support input key pad 238, other individual keys 239, and display screen 236 in respective access slots shown in the control face 234 of FIG. 2A.

Figure 3A:
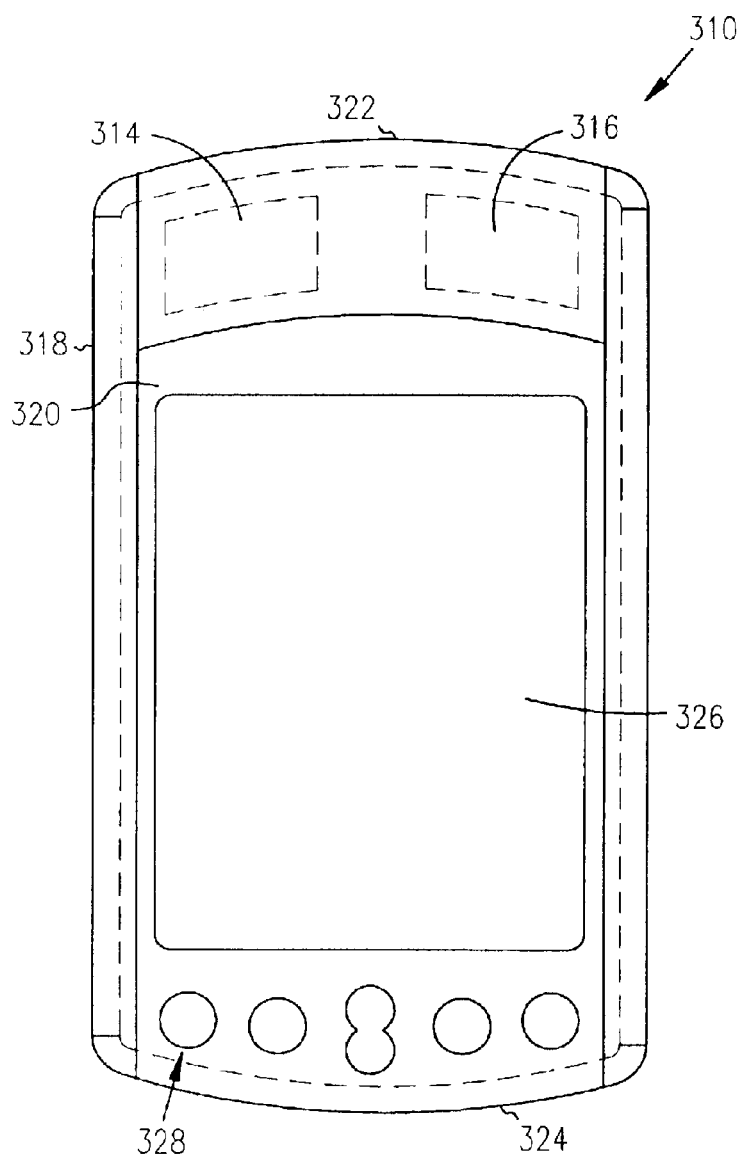
FIGS. 3A–3C illustrate views for another embodiment of an electronic navigational device according to the teachings of the present invention.
Figure 3B:
Figure 3C:
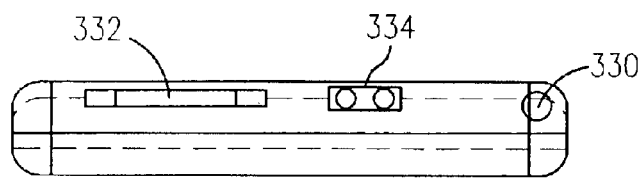

FIGS. 3A–3C illustrate views for another embodiment of an electronic navigational device 310 according to the teachings of the present invention. The navigational device 310 shown in FIGS. 3A–3C includes a personal digital assistant (PDA) with integrated GPS receiver and cellular transceiver according to the teachings of the present invention. The GPS integrated PDA operates with an operating system (OS) such as, for example, the well-known Palm or Pocket PC operating systems, or the lesser-used Linux OS. As shown in the top view of FIG. 3A, the GPS integrated PDA 310 includes an internal integrated GPS patch antenna 314 and a cellular transceiver 316 contained in a housing 318. The housing 318 is generally rectangular with a low profile and has a front face 320 extending from a top end 322 to a bottom end 324. Mounted on front face 320 is a display screen 326, which is touch sensitive and responsive to a stylus 330 (shown stored in the side view of FIG. 3B) or a finger touch. FIGS. 3A–3C illustrate the stylus 330 nested within housing 318 for storage and convenient access in a conventional manner. The embodiment shown in FIG. 3A illustrates a number of control buttons, or input keys 328 positioned toward the bottom end 324. The invention, however, is not so limited and one of ordinary skill in the art will appreciate that the input keys 328 can be positioned toward the top end 322 or at any other suitable location. The end view of FIG. 3C illustrates a map data cartridge bay slot 332 and headphone jack 334 provided at the top end 322 of the housing 318. Again, the invention is not so limited and one of ordinary skill in the art will appreciate that a map data cartridge bay slot 332 and headphone jack 334 can be provided at the bottom end 324, separately at opposite ends, or at any other suitable location.

According to embodiments of the invention, the GPS integrated PDA 310 includes a calendar function and an address book function. In some embodiments the GPS integrated PDA 310 includes a to-do list function. In some embodiments the GPS integrated PDA 310 includes a graffiti function. In some embodiments the GPS integrated PDA 310 includes a date book function. In some embodiments the GPS integrated PDA 310 includes a calculator function. In some embodiments the GPS integrated PDA 310 includes a memo pad or note pad function.

It should be understood that the structure of GPS integrated PDA 310 is shown as illustrative of one type of integrated PDA navigation device. Other physical structures, such as a cellular telephone and a vehicle-mounted unit are contemplated within the scope of this invention.

FIGS. 2A–2B and 3A–3C are provided as illustrative examples of hardware components for a navigational device according to the teachings of the present invention. However, the invention is not limited to the configuration shown in FIGS. 2A–2B and 3A–3C. One of ordinary skill in the art will appreciate other suitable designs for a hardware device which can accommodate the present invention.

Figure 4A:
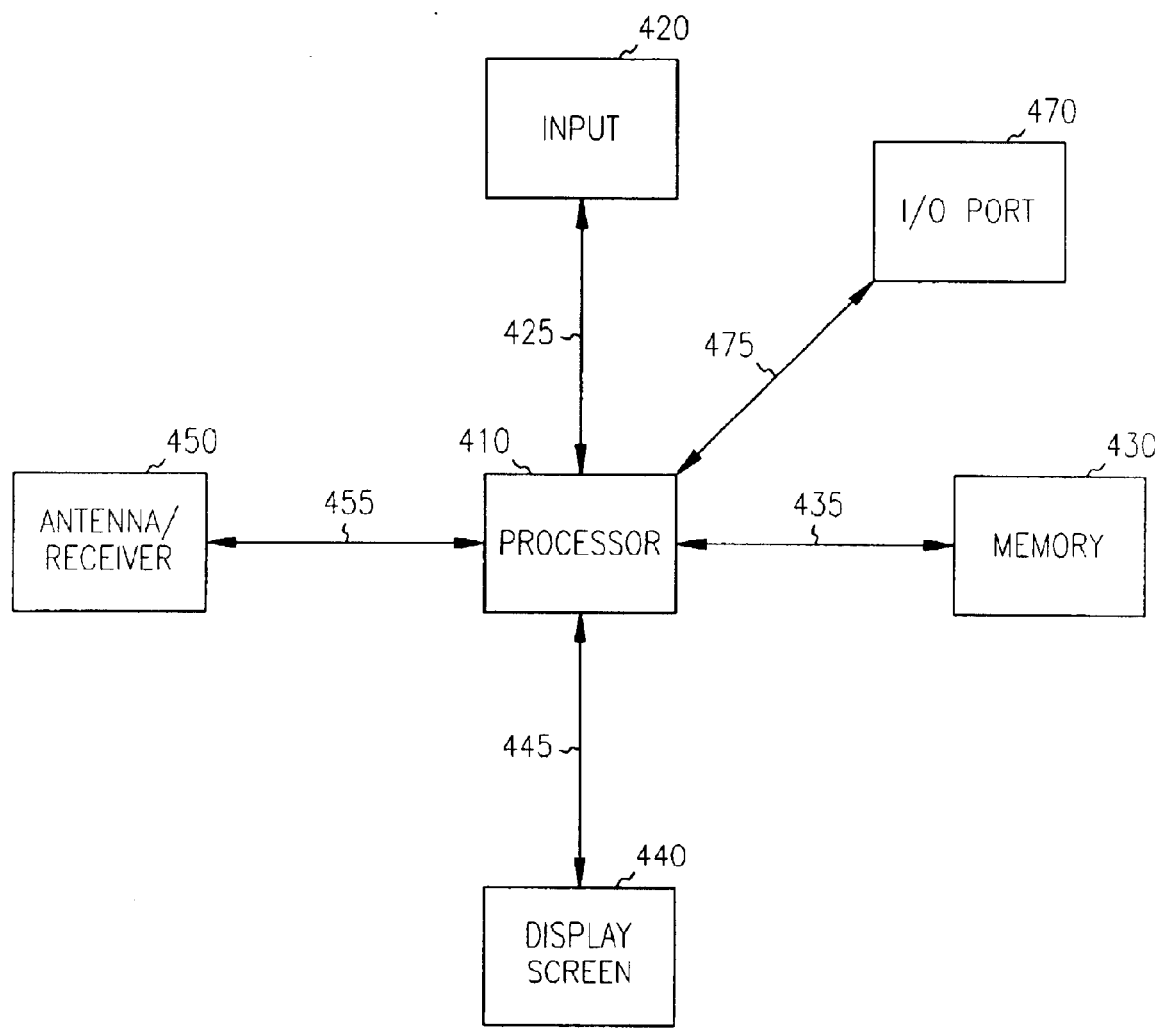
FIG. 4A is a block diagram of one embodiment for the electronic components within the hardware of FIGS. 2A–2B according to the teachings of the present invention.

FIG. 4A is a block diagram of one embodiment for the electronic components within the hardware of FIGS. 2A–2B, such as within housing 332 and utilized by the electronic navigational device. In the embodiment shown in FIG. 4A, the electronic components include a processor 410 which is connected to an input 420, such as keypad 420 via line 425. It will be understood that input 420 can alternatively be a microphone for receiving voice commands. Processor 410 communicates with memory 430 via line 435. Processor 410 also communicates with display screen 440 via line 445. An antenna/receiver 450, such as a GPS antenna/receiver is connected to processor 410 via line 455. It will be understood that the antenna and receiver, designated by reference numeral 450, are combined schematically for illustration, but that the antenna and receiver may be separately located components, and that the antenna may be a GPS patch antenna or a helical antenna. The electronic components further include I/O ports 470 connected to processor 410 via line 475.

Figure 4B:
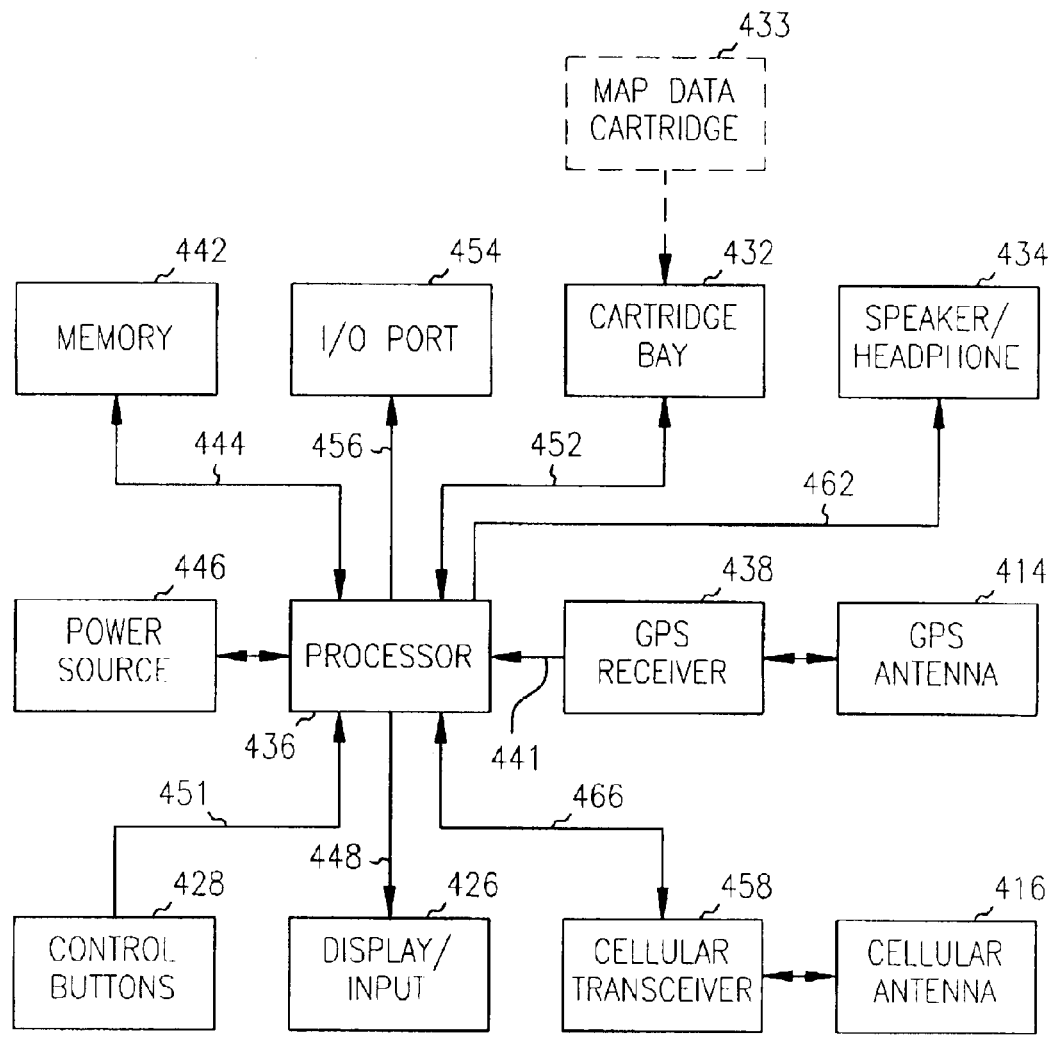
FIG. 4B is a block diagram of one embodiment for the electronic components within the hardware of FIGS. 3A–3C according to the teachings of the present invention.

FIG. 4B is a block diagram of one embodiment for the electronic components within the hardware of FIGS. 3A–3C and utilized by the GPS integrated PDA 310 according to the teachings of the present invention. The electronic components shown in FIG. 4B include a processor 436 which is connected to the GPS antenna 414 through GPS receiver 438 via line 441. The processor 436 interacts with an operating system (such as PalmOS; Pocket PC, and others) that runs selected software depending on the intended use of the PDA 310. Processor 436 is coupled with memory 442 such as RAM via line 444, and power source 446 for powering the electronic components of PDA 310. The processor 436 communicates with touch sensitive display screen 426 via data line 448.

The electronic components further include two other input sources that are connected to the processor 436. Control buttons 428 are connected to processor 436 via line 451 and a map data cartridge 433 inserted into cartridge bay 432 is connected via line 452. A conventional serial I/O port 454 is connected to the processor 436 via line 456. Cellular antenna 416 is connected to cellular transceiver 458, which is connected to the processor 436 via line 466. Processor 436 is connected to the speaker/headphone jack 434 via line 462. The PDA 310 may also include an infrared port (not shown) coupled to the processor 436 that may be used to beam information from one PDA to another.

As will be understood by one of ordinary skill in the art, the electronic components shown in FIGS. 4A and 4B are powered by a power source in a conventional manner. As will be understood by one of ordinary skill in the art, different configurations of the components shown in FIGS. 4A and 4B are considered within the scope of the present invention. For example, in one embodiment, the components shown in FIGS. 4A and 4B are in communication with one another via wireless connections and the like. Thus, the scope of the navigation device of the present invention includes a portable electronic navigational aid device.

According to the teachings of the present invention, the electronic components embodied in FIGS. 4A and 4B are adapted to provide an electronic navigational aid device with efficient route path generation and communication. That is, according to the teachings of the present invention a processor 410 is provided with the electronic navigational aid device. A memory 430 is in communication with the processor. The memory 430 includes cartographic data, a current device location, and a generated route to a desired destination stored therein. The cartographic data include data indicative of thoroughfares of a plurality of types. A display 440 is in communication with the processor 410 and is capable of displaying the cartographic data to a user. The electronic navigational aid device processes a user's travel along the generated route using a set of processing algorithms and cartographic data stored in memory to operate on signals (e.g., GPS signals, received from the antenna/receiver 450 or any wireless signals) as the same will be known and understood by one of ordinary skill in the art upon reading this disclosure.

As shown in FIGS. 4A and 4B, the device further includes a display 440 in communication with the processor 410 and the memory 430. The display 440 is adapted to display a "convergence" and/or a "solution," as the terms have been described herein, between any two of the number of locations. According to the teachings of the present invention, the device incorporates these and other functions as will be explained in more detail below in connection with FIGS. 6–9.

Moreover, it will be readily appreciated that the various electrical components shown in FIG. 4A and 4B need not be physically connected to one another since wireless communication among the various depicted components is permissible and intended to fall within the scope of the present invention.

Figure 5:
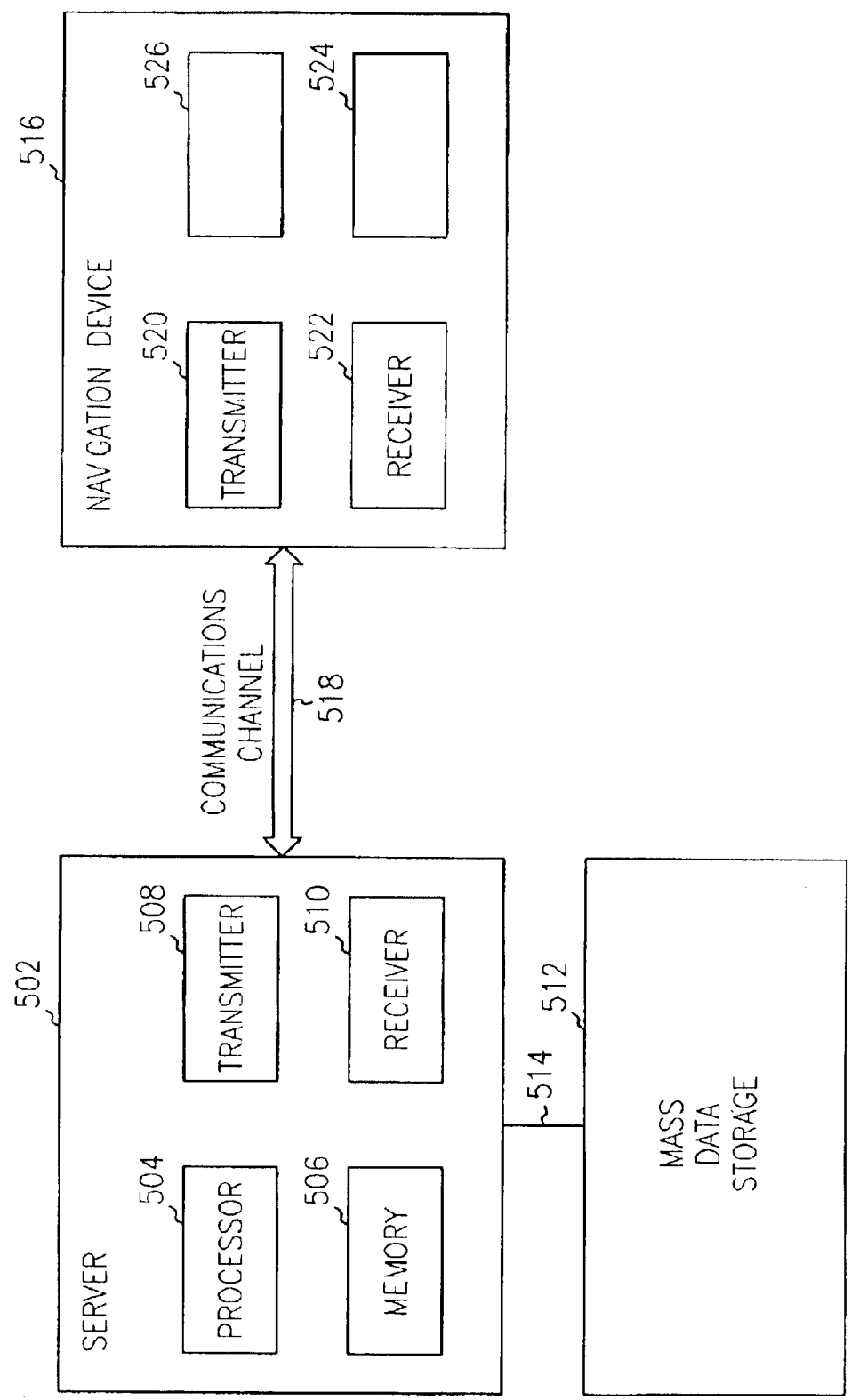
FIG. 5 is a block diagram of a navigation system according to the teachings of the present invention.

FIG. 5 is a block diagram of an embodiment of a navigation system according to the teachings of the present invention. The navigation system includes a server 502. According to one embodiment, the server 502 includes a processor 504 operably coupled to memory 506, and further includes a transmitter 508 and a receiver 510 to send and receive communication signals. The transmitter 508 and receiver 5 10 are selected or designed according to the communication requirements and the communication technology used in the communication design for the navigation system. The functions of the transmitter 508 and the receiver 510 can be combined into a single transceiver.

The navigation system further includes a mass data storage 512 coupled to the server 502 via communication link 514. The mass data storage 512 contains a store of navigation data. One of ordinary skill in the art will understand, upon reading and comprehending this disclosure, that the mass data storage 512 can be separate device from the server 502 or can be incorporated into the server 502.

The navigation system further includes a navigation device 516 adapted to communicate with the server 502 through the communication channel 518. According to one embodiment, the navigation device 516 includes a processor and memory, as previously shown and described with respect to the block diagrams of FIG. 4A and 4B. Furthermore, the navigation device 516 includes a transmitter 520 and receiver 522 to send and receive communication signals through the communication channel 518. The transmitter 520 and receiver 522 are selected or designed according to the communication requirements and the communication technology used in the communication design for the navigation system. The functions of the transmitter 520 and receiver 522 can be combined into a single transceiver.

Software stored in the server memory 506 provides instructions for the processor 504 and allows the server 502 to provide services to the navigation device 516. One service provided by the server 502 involves processing requests from the navigation device 516 and transmitting navigation data from the mass data storage 512 to the navigation device 516. According to one embodiment, another service provided by the server 502 includes processing the navigation data using various algorithms for a desired application, and sending the results of these calculations to the navigation device 516.

The communication channel 518 is the propagating medium or path that connects the navigation device 516 and the server 502. According to one embodiment, both the server 502 and the navigation device 516 include a transmitter for transmitting data through the communication channel and a receiver for receiving data that has been transmitted through the communication channel.

The communication channel 518 is not limited to a particular communication technology. Additionally, the communication channel 518 is not limited to a single communication technology; that is, the channel 518 can include several communication links that use a variety of technology. For example, according to various embodiments, the communication channel is adapted to provide a path for electrical, optical, and/or electromagnetic communications. As such, the communication channel includes, but is not limited to, one or a combination of the following: electrical circuits, electrical conductors such as wires and coaxial cables, fiber optic cables, converters, radio-frequency (RF) waveguides, the atmosphere, and empty space. Furthermore, according to various embodiments, the communication channel includes intermediate devices such as routers, repeaters, buffers, transmitters, and receivers, for example.

In one embodiment, for example, the communication channel 518 includes telephone and computer networks. Furthermore, in various embodiments, the communication channel 516 is capable of accommodating wireless communication such as radio frequency, microwave frequency and infrared communication, and the like. Additionally, according to various embodiments, the communication channel 516 accommodates satellite communication.

The communication signals transmitted through the communication channel 518 include such signals as may be required or desired for a given communication technology. For example, the signals can be adapted to be used in cellular communication technology, such as time division multiple access (TDMA), frequency division multiple access (FDMA), code division multiple access (CDMA), global system for mobile communications (GSM), and the like. Both digital and analog signals can be transmitted through the communication channel 518. According to various embodiments, these signals are modulated, encrypted and/or compressed signals as can be desirable for the communication technology.

The mass data storage includes sufficient memory for the desired navigation application. Examples of mass data storage include magnetic data storage media such as hard drives, optical data storage media such as CD ROMs, charge storing data storage media such as Flash memory, and molecular memory. Moreover, as one skilled in the art will readily appreciate the mass storage need not be a single device as a plurality of storage devices can be logically associated to form a distributed mass storage device of the present invention.

According to one embodiment of the navigation system, the 502 server includes a remote server accessed by the navigation device 516 through a wireless channel. According to other embodiments of the navigation system, the server 502 includes a network server located on a local area network (LAN), wide area network (WAN), a virtual private network (VPN) and server farms.

According to another embodiment of the navigation system, the server 502 includes a personal computer such as a desktop or laptop computer. In one embodiment, the communication channel 518 is a cable connected between the personal computer and the navigation device. According to one embodiment, the communication channel 518 is a wireless connection between the personal computer and the navigation device 516.

FIG. 5 presents yet another embodiment for a collective set of electronic components adapted to the present invention. As one of ordinary skill in the art will understand upon reading this disclosure, the navigation system of FIG. 5 is adapted to the present invention in a manner distinguishable from that described and explained in detail in connection with FIGS. 4A and 4B.

The mass storage device 512 connected to the server can include volumes more cartographic and route data than that which is able to be maintained on the navigational device 516 itself. In this embodiment, the server 502 processes the majority of a user's travel along the route using a set of processing algorithms and the cartographic and route data stored in memory 512 and can operate on signals, e.g. GPS signals, originally received by the navigational device 516. Similar to the navigational device of FIGS. 4A and 4B, the navigation device 516 in the system is outfitted with a display 524 and GPS capabilities 526.

Figure 6:
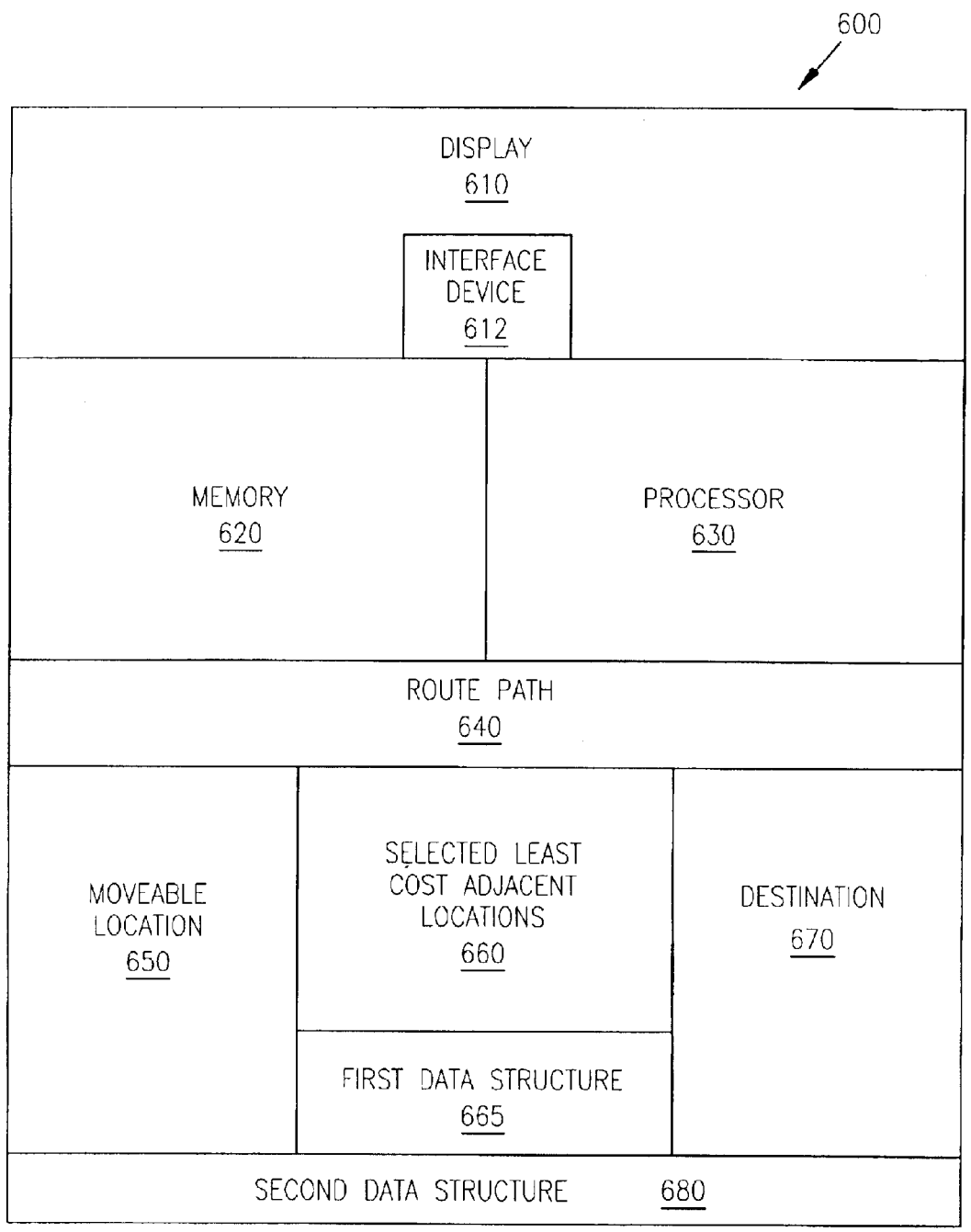
FIG. 6 is a block diagram of one embodiment of a navigation device according to the teachings of the present invention.

FIG. 6 shows a block diagram for one embodiment of a navigation device 600 according to the teachings of the present invention. The navigational device 600 includes a processor 630, a memory 620 in communication with the processor 630, wherein the device 630 dynamically generates a route path 640 using the processor 630 and the memory 620 from a moveable location 650 associated with the device 600 to a destination 670. Furthermore, the navigational device 600 illustrated in FIG. 6, can be embodied in previously presented FIGS. 4A, 4B, and 5.

The route path 640 is dynamically generated by repetitively expanding one or more adjacent locations. Adjacent locations can in one embodiment be thoroughfare intersections directly connected to a last selected least cost adjacent location 660. As will be readily appreciated by those skilled in the art, there can be a variety of ways to electronically represent intersections or thoroughfares with cartographic data of the present invention and all are intended to fall within the scope of the present invention.

In one embodiment, adjacent locations or intersections are represented as unique nodes with each node having a node identification number. These node identifications can then be stored in a data structure such as an array, where direct access to the node is acquired by accessing the element of the array referenced by the node identification number. For example, a node having a node identification of 5 and having additional cartographic data associated with the node can directly access the $5^{th}$ element of array "A" to acquire the relevant cartographic data with the a single reference of A[5], or A[5-1] where the array begins with a $0^{th}$ element.

Once a node's cartographic data are directly referenced, an additional data structure is immediately available to acquire additional relevant data, such as all the node identifications connected to the referenced node, distance from the referenced node to each connected node, thoroughfare classifications associated with the thoroughfare used to connect the referenced node to each connected node, historic elapsed time of travel data associated with traveling from the referenced node to each connected node, a particular user's travel time or speed in traveling from the referenced node to each of the connected nodes, and like. Further, as one of ordinary skill in the art will appreciate, a user can be proximate to the device. However, the invention is not so limited.

Additionally, the device's 600 moveable location 650 can equally be associated with a nearest node identification, and the device's 600 destination 670 likewise associated with a node identification. By manipulating the cartographic data, as node identification numbers directly indexed and referenced to acquire additional cartographic data, the problem associated with generating the route path 640 is reduced to manipulating numbers (e.g, node identifications).

In this way, the device 600 can use any recognized triangulation algorithm or any other algorithm to readily identify it's present moveable location 650 and optionally the device's speed of travel, which is dynamically changing as the device 600 moves. Furthermore, a user inputs or otherwise provides to the device 600 a destination 670. Nearly instantaneously the processor 630, identifies a node identification associated with the present moveable location 650 and a second node identification associated with the destination 670.

Next, the processor 630 in cooperation with the memory 620 using a set of executable instructions begins an evaluation to generate the route path 640. This can be a single evaluation starting with the moveable location 650 progressing towards the destination 670, or starting with the destination 670 and progressing towards the moveable location 650. Alternatively, the evaluation can be two concurrent evaluations occurring at both the moveable location 650 and the destination 670 until a developing route path 640 converges or intersects at one or more node identifications.

As a single evaluation or as multiple evaluations progresses, each then existing node identification is expanded to produce its adjacencies (e.g., connected node identifications). A cost value is assigned to each expanded or opened node identification, this cost in one embodiment is a single integer value, although as one skilled in the art will appreciate the value can include multiple data types or structures of data and the present invention is not intended to be constrained by any particular implementation of a cost value. The cost for each opened node can be readily calculated in a variety of ways, such as by adding the distance from the last selected node which was inserted into the route path 640 to the opened node being evaluated plus adding a linear distance associated with traveling in a straight line from the opened node to the destination 670. Alternatively, time of travel can be used to determine a cost value associated with an opened node, a combination of distance and time of travel, user's or operator's habits in traveling, traversing, or directing the device to the opened node, and others.

Once an opened adjacent node has a cost associated with it, the estimated cost relative to moving the device 600 from the moveable location 650 to the destination 670, it is inserted into a first data structure 665. Once all opened adjacent nodes are inserted into the first data structure 665, the first location or first node of that data structure is the least cost node. This least cost node becomes a selected least cost adjacent location 660 and can eventually comprise at least a portion of the dynamically generated route path 640.

As one skilled in the art will readily appreciate, this single data structure organized to always have the least cost node as its root or first node, provides direct access to selecting an optimal node while generating the route path 640, while reducing a capacity requirement of the memory 620 since parallel or multiple data structures are not required. In other words, without the least cost node being the root node double keys will need to be maintained in parallel data structures resulting in wasted memory, since the node identification as well as the cost node will need maintained in an efficient and readily accessible data structure. As one skilled in the art will appreciate, having the node identification permits more efficient and rapid searching to determine if a node under evaluation has already been explored.

Furthermore, the moveable location 650, the selected least cost adjacent locations 660, and the destination 670 can be stored in a separate second data structure 680 until the route path 640 is generated. In this way the route path 640 is readily assembled and communicated to the display 610 of the device 600. As will be appreciated the display can be operable to include an interface device 612 which audibly communicates at least portions of the route path 640 to the device. Accordingly, the display 610 can be audibly enabled as well as graphically enabled.

Moreover, in one embodiment the first data structure 665 is a treap organized as a binary tree (e.g., node identifications used to keep binary order) but in heap order (e.g., with respect to cost nodes), such that the root is always the least cost node. A treap data structure includes a binary tree organized in heap and binary tree order, such that the least cost node of the treap data structure is always the root node of the data structure. Further, the second data structure in another embodiment is a standard binary tree having an additional key which identifies the sequence with which each node was inserted into the binary tree. In this way, the binary tree when recursively traversed can be put in sequence order to provide the appropriate route path 640 to the display 610 of the device 600, if desired. Of course, not all nodes in the binary tree need to be included in the route path 640 and selection of nodes to include within the route path 640 can be customized as needed.

As previously discussed a variety of configurations to device 600 can be made without departing from the scope of the present invention. For example, the device 600 can be permanently affixed to a transportation vehicle, detachably affixed to a transportation vehicle, a portable handheld device, an intelligent appliance, a computing device, an intelligent apparel worn by a person or animal, and the like. Moreover, the memory 620 can be remote from the processor 630. And, the device 600 can be equipped to transmit to a separate device the generated route path 640. All of these configurations now known, or hereafter developed are intended to fall within the tenets of the present invention.

Figure 7:
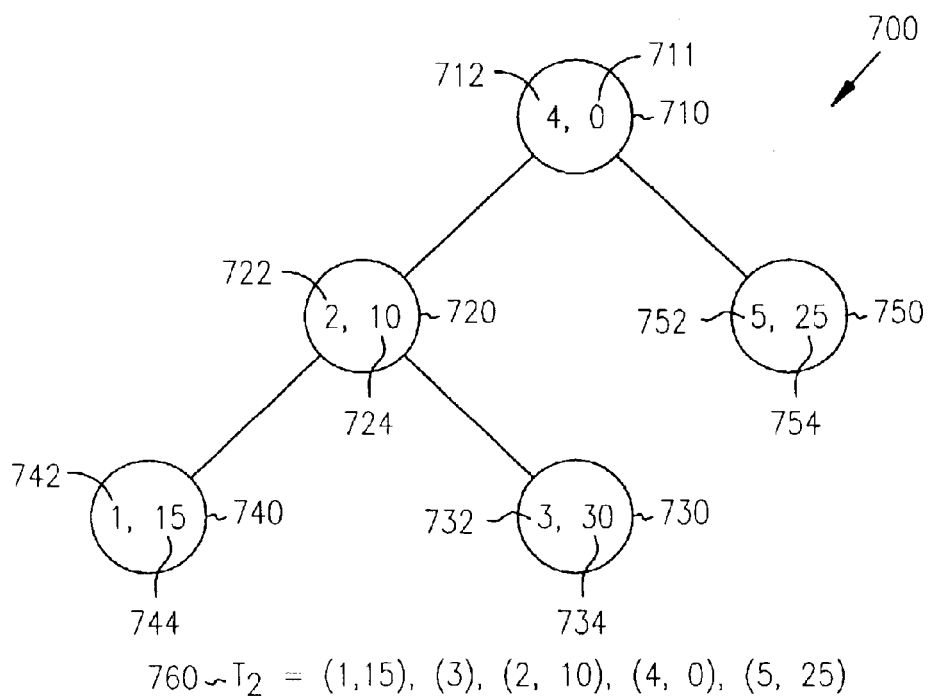
FIG. 7 is a diagram of one embodiment of a first data structure according to the teachings of the present invention.

FIG. 7 is one diagram of one example embodiment of a first data structure 700 according to the teachings of the present invention. One data structure which can be used by the present invention in one embodiment is a treap data structure, such as the example treap data structure 700 depicted in FIG. 7.

In this embodiment, which is provided by way of illustration only, the treap 700 is represented by $T_1$ 760 and includes a root node or first location 710 having an order pair 4 (712) and 0 (714). The root note 710 has two children, a left child 720 having an ordered pair 2 (722) and 10 (724), and a right child 750 having an ordered pair 5 (752) and 25 (754). The right child 750 has no children of its own, it is therefore said to be a leaf node. However, the left child 720 includes both a left child 740 having an ordered pair 1 (742) and 15 (744), and a right child 730 having an ordered pair 3 (732) and 30 (734).

The distinguishing feature of the treap 700 is that the structure always maintains a typical binary tree order using the first order pair value as a first key, such that a child node to the left of a parent node has a first ordered pair value which is less than that of its parent. And, a child node to the right of a parent node has a first ordered pair value which is greater than that of its parent. Moreover, the treap 700 maintains the root node 710 of the binary tree as a least cost node of the entire treap 700 structure similar to a heap, such that the second ordered pair value of root node 710 is 0 (714) and the lowest cost value of the entire treap 700 structure. A heap order is such that the children of a parent node always have a higher cost than the parent node from which they derive. As one skilled in the art will readily recognizes this structure and order is readily maintained by using pointer data structures, and the binary tree structure is rotated as nodes are inserted or deleted from the treap 700 to maintain the appropriate order.

In this way, in one embodiment by using the treap 700 data structure the least cost node associated with generating a route path can always be accessed with using a single reference to the treap 700 to obtain the least cost node. This reduces processing complexity, reduces duplicative data structures thereby reducing memory capacity requirements and overall improves processing throughput when generating the route path since a single reference obtains the least cost node.

Figure 8:
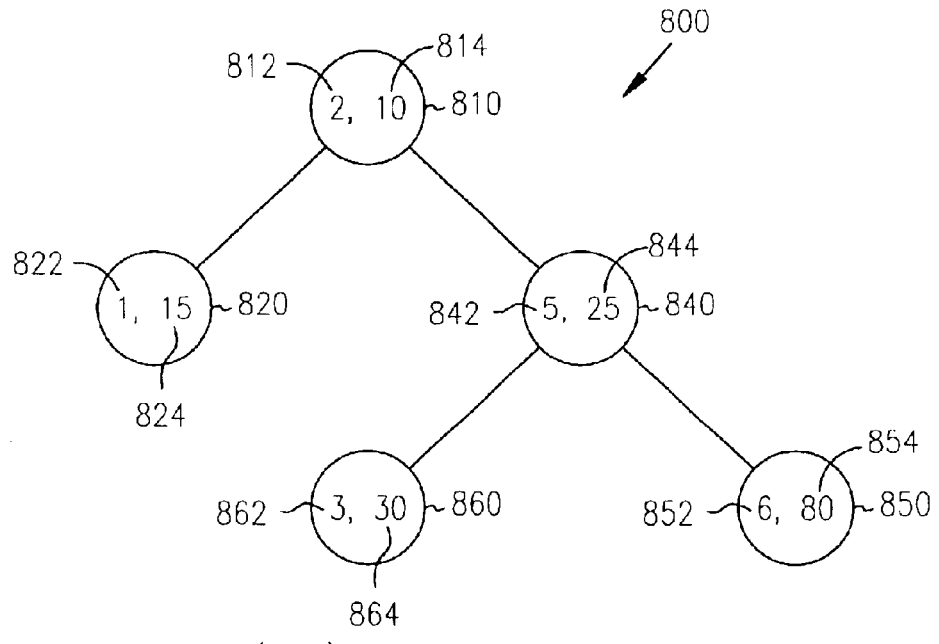
FIG. 8 is a diagram of one embodiment of a first data structure after performing a delete and insert operation on the first data structure in accordance with the teachings of the present invention.

FIG. 8 is one diagram for one embodiment of a first data structure 800 after performing delete 860 and insert 870 operations on the first data structure 800 in accordance with the teachings of the present invention.

Before performing delete 860 and insert 870 operations on treap 800, the treap 800 appears as it did in FIG. 7, $T_1$ 760, after the operations treap 800 appears as $T_2$ having a root node 810 with an ordered pair of 2 (812) and 10 (814). The root node includes a left child 820 having an ordered pair of 1 (822) and 15 (824), and a right child 840 having an ordered pair 5 (842) and 25 (844). The left child 820 has no children. The root's 810 right child 844 has a right child 850 having an ordered pair 6 (852) and 80 (854), and a left child 860 having ordered pair 3 (862) and 30 (864).

As is readily observable $T_1$ 760 had its root 710 removed in $T_2$ 880 with the delete operation 860, and by rotating $T_1$ 760, $T_2$ 880 now includes a root 810 having its second ordered pair value of 10 (814), which is the least cost node of treap 800. Moreover, the insert operation 870 resulted in $T_2$ 880 having a rightmost leaf node 850 with its highest first ordered pair value of 6 (852) for the entire treap 800, thus maintaining binary tree order as well.

Figure 9:
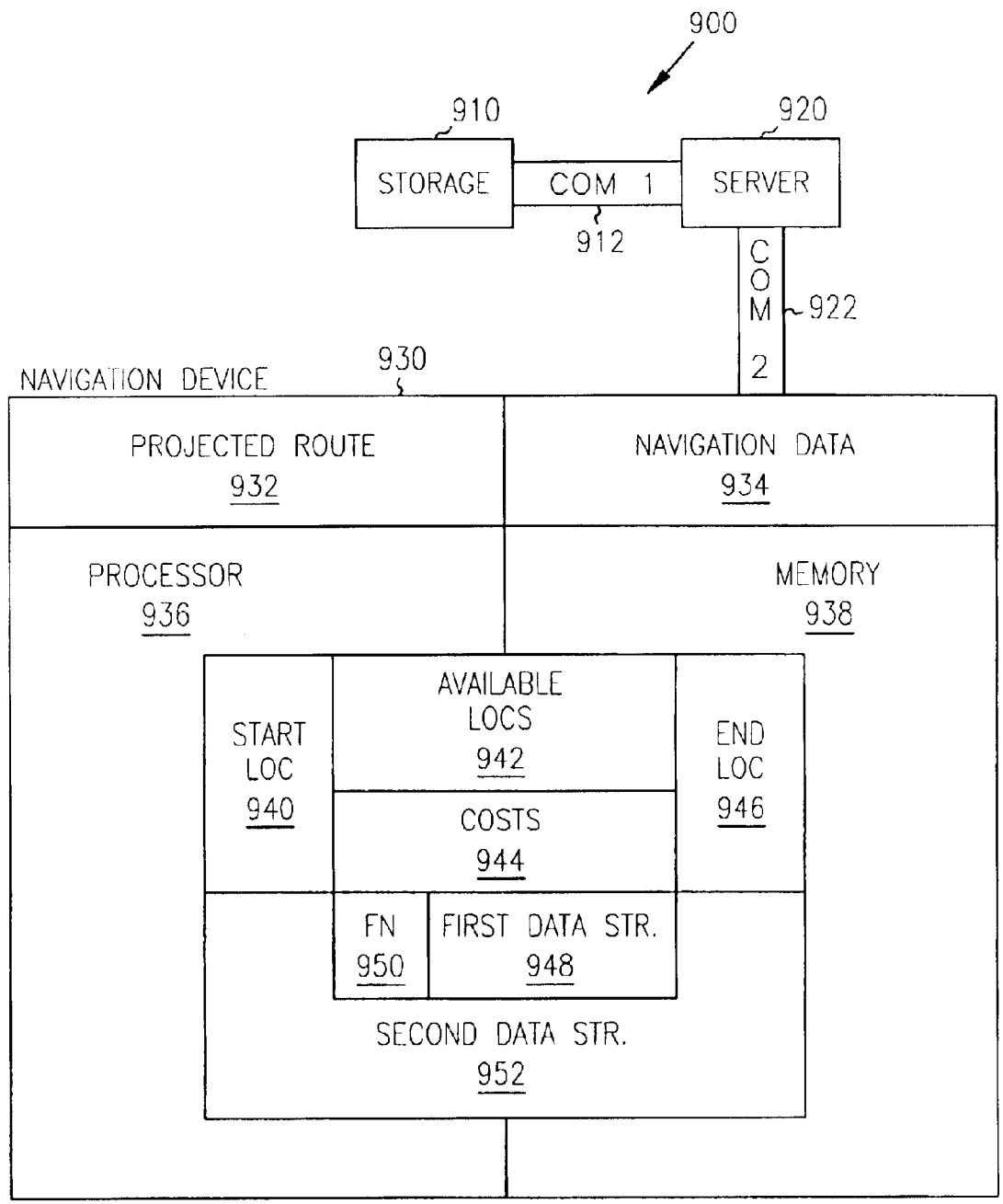
FIG. 9 is a diagram of one embodiment of a navigational system according to the teachings of the present invention.

FIG. 9 shows one diagram of one embodiment for a navigational system 900 according to the teachings of the present invention. The system 900 includes storage 910 adapted to store navigation data 934, a server 920 adapted to communicated with the storage 910 through a communications channel COM1 912, and a navigation device 930 through communications channel COM2 922.

The navigation device 930 further includes a processor 936 in communication with a memory 938 and is adapted to retrieve navigation data 934 from the server 920 though COM2 922. The navigation device's 930 processor 936 and memory 938 cooperate using a set of executable instructions to generate a projected route 932 using the navigation data 934 which include a starting location 940 one or more available locations 942 and an ending location 946. Further, each available location 942 has an associated cost 944 which is calculated in relation to selecting a particular available location 942 to generate a least cost projected route 932.

The available locations 942 are evaluated in one embodiment after a last least cost location has been selected and inserted into a second data structure 952. All available locations 942 connected or associated with the last least cost node selected are evaluated and inserted into a first data structure 948 such that a first location 950 of the first data structure 948 is always a least cost location associated with the entire then existing first data structure 948. As previously presented the cartographic data acquisition and cost value assignment can be achieved in a variety of ways and inserted into a variety of first data structures 948, such as that presented herein and above.

The communication channels COM1 912 and COM2 922 need not be hardwired as any single wireless channel or combination of hardwired and wireless channels can be implemented without departing from the present invention. Further, although system 900 depicts the project route 932 being generated entirely within navigation device 930 as one skilled in the art will readily appreciate, this generation can occur in concert with the server 920. Moreover, server 920 can be a server in close proximity to navigation device 930 such that COM2 922 is achieved using infrared or radio frequency communications. Further, COM2 could be an Internet or peer-to-peer connection between the server 920 and the navigation device 930. It is readily apparent that a variety of configurations, now known or hereafter developed, are intended to fall within the scope of the present invention.

The first data structure 948 in one embodiment can be a treap data structure and the second data structure 952 can be a binary tree. Also, locations are inserted into the binary tree once selected as the first node 950 of the first data structure 948 (e.g., treap) such that a complete project route 932 can be generated by traversing the second data structure 952 (e.g., binary tree).

Moreover, the start location 940 can be dynamically changing as the navigation device 930 travels along a present projected route 932 or deviates from the projected route 932. Initially, when starting to generate a projected route 932 the starting location 940 is inserted into the second data structure 952 along with the ending location 946, comparisons to available adjacent locations 942 can be made by proceeding from the starting location 940 towards the ending location 946, or by proceeding from the ending location 946 towards the starting location 940. Alternatively, comparisons can be made in parallel until one or more convergences of locations produce one or more solutions for a projected route 932, with the least cost solution being selected as the project route 932.

Further, as will be readily apparent to those skilled in the art the starting location 940 may not be a location identified as an intersection or node identification as previously presented, however all available and connected node identifications can be readily obtained by the starting location's 940 address or location. In this way, the optimal projected route 932 may not always be immediately in a direction heading towards the ending location 946, as some backward travel may produce the most optimal projected route 932.

Figure 10:
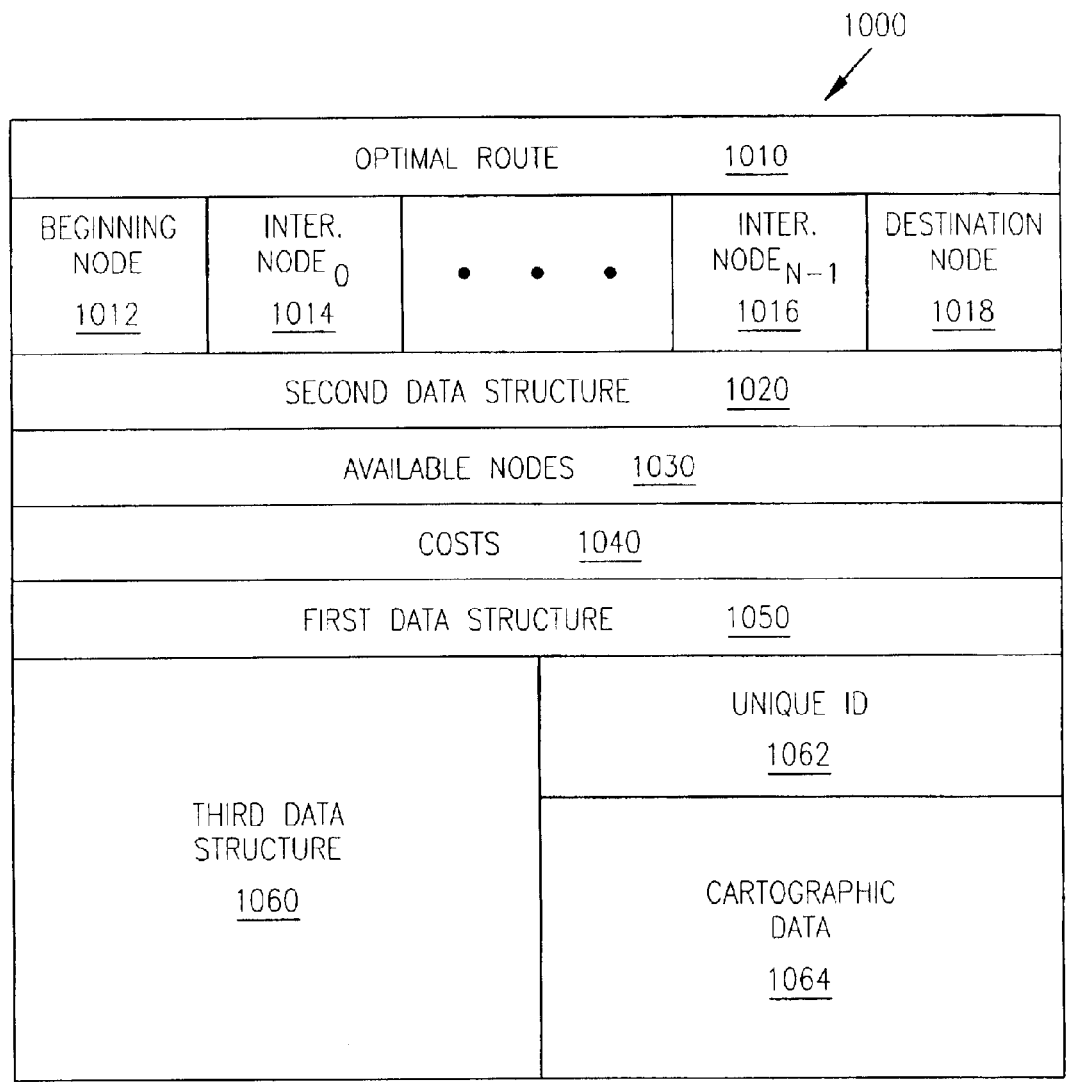
FIG. 10 is a block diagram of one embodiment of functional data according to the teachings of the present invention.

FIG. 10 shows a block diagram of one embodiment of functional data 1000 according to the teachings of the present invention. The functional data 1000 includes a beginning node 1012 representative of an initial geographic location, a destination node 1018 representative of a desired geographic location, and optimal route 1010 which includes the beginning node 1012, one or more selected intermediated nodes 1014–1016 from one or more available nodes 1030, and the destination node 1018.

Each of the available nodes 1030 become available for inspection and possible selection into the optimal route 1010 once a last selected node has been placed into the dynamically generated optimal route 1010. Initially, the optimal route 1010 comprises a second data structure 1020 having the beginning node 1012 and the destination node 1018. Furthermore, initially a first data structure 1050 is empty or null. Next, either the beginning node 1012 or the destination node 1018 are available for inspection, or both if analysis is proceeding in parallel from the beginning node 1012 and the destination node 1018 as presented above. As a node is inspected, all connected or adjacent nodes become available from the available nodes 1030 and a cost 1040 is associated with each available node. These inspected available nodes 1030 are then inserted into a first data structure 1050, such that the first node of the first data structure 1050 is always the least cost node of the first data structure 1050.

As inspection proceeds, the second data structure 1020 will include the beginning node 1012, one or more selected intermediate nodes 1014–1016 and the destination node 1018. Further, when traversed the second data structure 1020 can produce an ordered path resulting in an optimal route 1010, although in some embodiments the ordered path need not be an optimal route. In some embodiments, the first data structure 1050 is a treap and the second data structure 1020 is a binary tree. Additionally, the second data structure 1020 need not include only nodes associated with the optimal route 1010 generated, since multiple routes may be present within the second data structure 1020, and further optimization techniques can be used to selective pick nodes within the second data structure 1020 for generating the optimal route 1010. Further, additional cartographic data 1064 can be obtained from a third data structure 1060 which is organized such that direct access is achieved with any node by using a unique node identification 1062, as discussed above.

As will be readily apparent to those skilled in the art, the functional data 1000 embodied in FIG. 10 will substantially decrease memory requirements associated with a navigational device and correspondingly increase processing throughput when generating optimal routes, such as optimal route 1010. Memory is reduced by maintaining a single data structure of adjacent nodes in binary tree order for node identifications and heap order for node costs, in this way multiple parallel data structures are unnecessary to maintain two keys on the nodes being evaluated during route generation. As is apparent, processing throughput is increased because the least cost node is quickly found.

Figure 11:
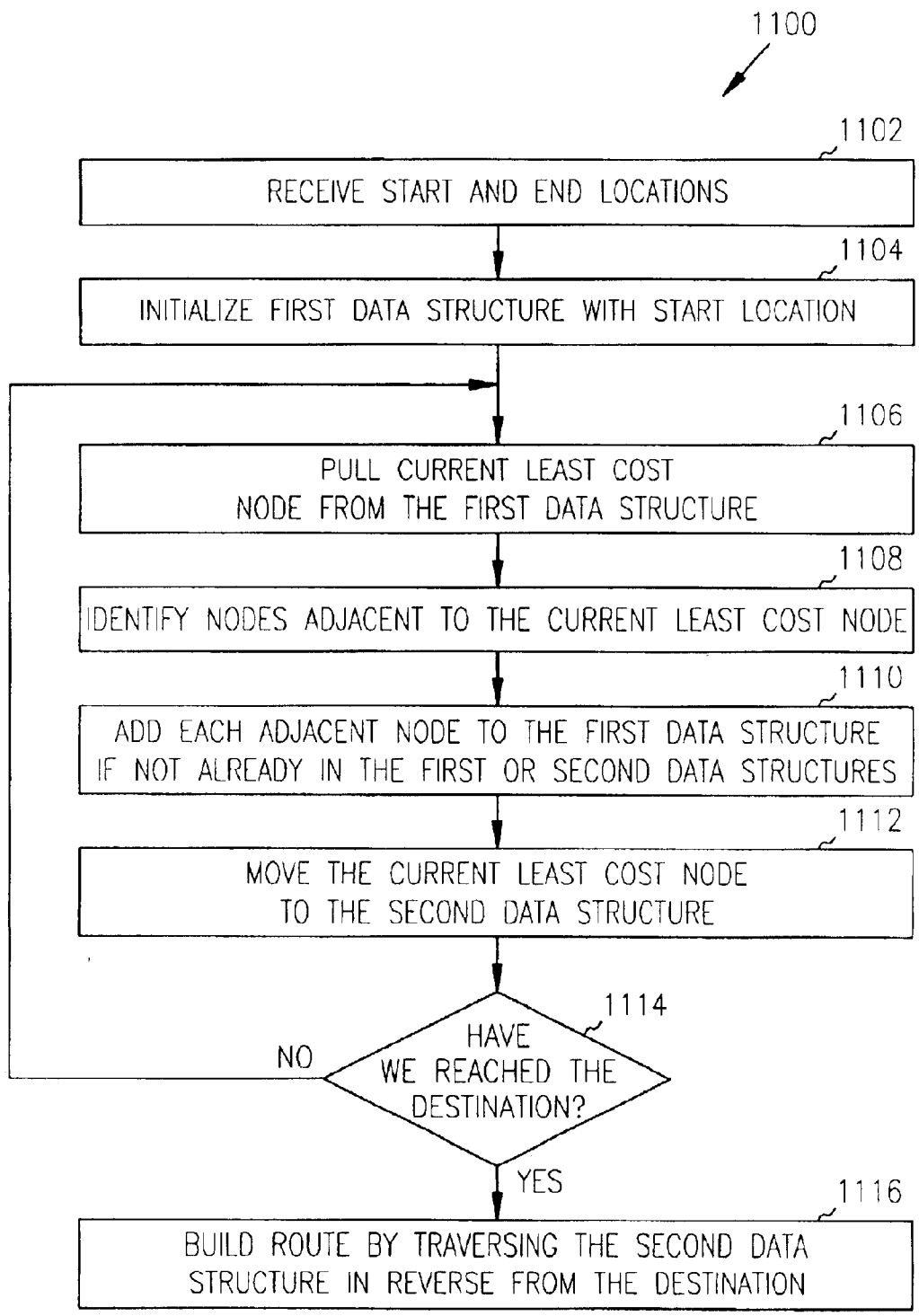
FIG. 11 is a flow diagram of one embodiment of a method for generating a projected route according to the teachings of the present invention.

FIG. 11 shows one flow diagram for one embodiment of a method 1100 for generating a projected route according to the teachings of the present invention. Initially, a set of executable instructions receives a start location and an ending location in step 1102. As will be appreciated, the set of executable instructions performing the method 1100 of FIG. 11 need not reside on a single processor and the memory required to execute the same can be distributed, local, volatile, non volatile, or combinations of all of the above.

In step 1104, one or more available locations are identified as existing near or in close proximity to the starting location. Moreover, the costs associated with the locations are computed or otherwise determined. The identified locations are then inserted into the first data structure such that a first location of a first data structure is always associated with the least cost location of the first data structure.

Next, in step 1106, a current least cost node is pulled from the root node of the first data structure for processing. In some embodiments, the first data structure is a treap data structure, such that the root node of the first data structure is always the least code node of the first data structure. In this way, ready access to the current least cost node is quickly and efficiently obtained.

In step 1108 all nodes adjacent to the current least cost node are identified and further examined in step 1110. Each examined adjacent node that is not already present in the first data structure or a second data structure are inserted into the first data structure, while maintaining the structure of the first data structure, such that the root node remains the least cost node of the first data structure. The second data structure, which is associated with previously removed nodes from the first data structure.

The current least cost node is then moved from the first location of the first data structure to the second data structure in step 1112. This removal operation results in the a new lease cost node being assembled into the root node location of the first data structure. Next, the second data structure is inspected to determine if any of the nodes in the second data structure is the destination node in step 1114. If a node within the second data structure is the destination node then a route has been resolved, and the resolved route, which represents a path between the start and ending locations, is built in step 1116. In some embodiments, the resolved route is built by traversing in reverse from the destination node located in the second data structure back through segments which were followed to reach it. However, if the destination node was not located in the second data structure in step 1114 then node expansion continues back at step 1106.

As previously discussed, a least cost location can be determined by determining the time or distance of travel from a last selected adjacent location to a last least cost location of the first data structure, this cost can also include an estimated travel time or distance of travel associated with least cost location to the ending location, this cost calculation can occur in step 1112 for the first evaluation and step 1114 for the second concurrent evaluation.

In still more embodiments, the second data structure can comprise an additional data structure such as, and by way of example only, a binary tree, or a list of binary trees. Furthermore, as one skilled in the art will readily appreciate, the unidirectional approach to calculating a navigation route using the first data structure (e.g., treap and the like) described in method 1100, is provided for purposes of illustration only, since it is readily appreciated that any bi-directional algorithm will benefit from the teachings of the present invention. Similarly, route calculation algorithms that find many potential routes before selecting the best-fit route, can also benefit.

Correspondingly, all navigation related algorithms using a first data structure (e.g., treap and the like) to improve operational performance and reducing memory requirements are intended to fall within the scope of the present invention. Additionally, method 1100 can be used in connection with any navigation device or devices to assist with navigation, and any such device including method 1100 are intended to fall within the scope of the present invention.

Furthermore, in one embodiment the projected route can comprise an additional data structure such as a binary tree and the selected locations can comprise treap data structures. Also, method 1100 can be used in connection with any navigation device or devices assisting with navigation.

Another embodiment of the present invention, provides for efficient purging of nodes being evaluated for purposes of generating a projected route. As was previously discussed, cartographic data is voluminous including a large number of nodes and potential pathways from a starting location to an ending location. Moreover, many navigational devices implementing route generating algorithms include very limited processor and memory resources. Further, the more processor and memory resources provided within a navigational device, the physical size of the device and the expense of the device increases.

One common approach for these existing algorithms, is to layer the cartographic data as a node network. The lowest layer of the network includes least significant roadways relative to the examined network, while the highest layer includes most significant roadways relative to the examined network. For example a first layer $L_0$, in some embodiments includes residential roadways, while a highest layer $L_{N-1}$, where n is >0, includes major interstate thoroughfares. As is apparent, the amount of navigable features at the lowest layer is often more voluminous then at the highest layer, since clearly more navigable choices occur within lower layers of the network.

Accordingly, one embodiment of the present invention, optimally reduces the memory requirements of any navigational device using the tenets of the present invention by using the first data structure of the present invention to house the navigational network, wherein lower layers of the network are dynamically purged from the first data structure, when the route generation algorithm transitions to a higher layer within the navigation network for purposes of generating the projected route. Once the route generation algorithm transitions to a higher layer within the network, expansion of any node occurring at the layer which the algorithm transitions from will not result in any matches for purposes of generating the projected route. Accordingly, considerable memory and processing time required by the route generation algorithm are reduced by pruning (e.g., purging, removing, deleting, and the like) the network layer which the algorithm transitions from.

If the first data structure is not pruned then space within the first data structure is wasted. Furthermore, operations inserting and removing nodes from the first data structure become more processor intensive since a larger number of nodes will need to be rearranged so that the lease cost node is the root node of the first data structure. With the present embodiment, by pruning the first data structure in the manner described above, remaining nodes in the first data structure will all reside on at least one thoroughfare that has a routing layer one layer higher than the current routing layer, for purposes of route generation.

Further and in still more embodiments, precious memory space, required by a navigational device having a route generation algorithm of the present invention, is further conserved by allowing a pointer associated with managing and accessing the second data structure to be configured as a variable length pointer, based on the initialized size of the second data structure. In this way, precious additional bytes of space are not wasted on a pointer when upon initialization of the second data structure, the exact byte size of the pointer, used to manage the second data structure, can be readily determined.

As one skilled in the art will readily appreciate, the byte size of the pointer determines the addressable address space which the pointer can access within the second data structure. Therefore, once given the size of the second data structure, or after determining the size of the second data structure, the required byte size of the pointer can be readily calculated. Furthermore, by saving even only a few bytes of memory space within the navigational device processor performance of any route generation algorithm is improved.

As one of ordinary skill in the art will understand upon reading this disclosure, the electronic components of the device shown in FIGS. 4A and 4B and components of the system shown in FIG. 5 can be embodied as computer hardware circuitry or as a computer-readable program, or a combination of both. In another embodiment, the system in FIG. 5 is implemented in an application service provider (ASP) system.

More specifically, in the computer-readable program embodiment, the programs can be structured in an object-orientation using an object-oriented language such as Java, Smalltalk, C++, and others, and the programs can be structured in a procedural-orientation using a procedural language such as C, PASCAL, and others. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI).

Of course it is readily appreciated by one skilled in the art that any programming methodology, programming language, programming interface, operating system, or computing environment, now known or hereafter developed can be readily deployed, without departing from the tenets of the present invention and all such implementation specific embodiments are intended to fall within the broad scope of the present invention.

CONCLUSION

The above systems, devices and methods have been described, by way of example and not by way of limitation, with respect to reducing memory capacity requirements, increasing processor throughput, and improving overall ease of user interaction with a navigation device. That is, the systems, devices, functional data, and methods provide for generating a projected route in connection with a navigational device which is more efficient and accurate than current systems, devices, and methods, without requiring more expensive system resources. The systems, devices, functional data, and methods of the present invention offer an improved generated projected route which provide more understandable, accurate, memory efficient, and timely capabilities in a navigation device while utilizing less resources.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices, functional data, and methods are used. The scope of the invention should be determined with reference to the appended claims, along with the full scope of equivalents to which such claims are entitled.

What is claimed is:

1. A personal digital assistant (PDA), comprising:
a calendar function;
an address book function;
a processor operably coupled to a memory and a display;
wherein the PDA dynamically generates a route path using the processor and the memory from a moveable location associated with the PDA to a destination of the PDA by repetitively dynamically expanding one or more adjacent locations and inserting the adjacent locations into a first data structure wherein one or more first locations of the first data structure are associated with a then existing least cost location in the route path, the route path is dynamically generated from the moveable location, the first locations of the first data structure, and the destination; and
wherein at least a portion of the route path is dynamically communicated to the display.

2. The PDA of claim 1, further comprising an interface device operable to audibly communicate the route path.

3. The PDA of claim 1, wherein the first locations are removed from the first data structure as the first locations become part of the route path and the removed first locations combine to form a second data structure.

4. The PDA of claim 1, wherein the first data structure is a treap and the second data structure is a binary tree.

5. The PDA of claim 1, wherein the display regularly displays the moveable location relative to the destination.

6. The PDA of claim 1, wherein the PDA dynamically resolves the moveable location using a triangulation algorithm.

7. The PDA of claim 1, wherein the PDA includes a telecommunication functionality operable for transmitting and receiving voice data.

8. The PDA of claim 1, wherein the PDA includes a wireless communication device operable using Bluetooth technology.

9. A PDA system, comprising:
a storage device to store navigation data;
a server operable to communicate with the storage device; and
a PDA device operable to communicate with and retrieve navigation data from the server via a communication channel, wherein the PDA device includes a processor in communication with a memory, wherein the processor and memory cooperate to:
generate a projected route from a starting location, one or more available locations, and an ending location, wherein each available location has an associated cost;
evaluate each available location as the projected route as the projected route is constructed if an available location is adjacent to a last inserted available location and has a least cost when compared to costs associated with all available adjacent locations; and
insert a adjacent locations into a first data structure such that a first location of the first data structure is a least cost location of the data structure, and wherein the first data structure is a treap data structure.

10. The system of claim 9, wherein the communication channel includes a wireless channel.

11. The system of claim 9, wherein the projected route is stored as a second data structure.

12. The system of claim 11, wherein the second data structure is a binary tree.

13. A PDA having functional data for selecting an optimal route, the functional data comprising:

a beginning node representative of an initial geographic location;
a destination node representative of a desired geographic location;
an optimal route, wherein the optimal route is a path starting with the beginning node and including one or more selected intermediate nodes and ending with the destination node; and
one or more available nodes wherein each available node includes a cost associated therewith including each available node in the path as one of the selected intermediate nodes, wherein as one or more of the available nodes become available for inspection the available nodes are organized as a first data structure, wherein a least cost available node is a first node of the data structure, and wherein the first data structure is a treat) data structure.

14. The PDA having the functional data of claim 13, further comprising a second data structure operable to house the beginning node, the selected intermediate nodes, and the destination node.

15. The PDA having the functional data of claim 14, wherein the second data structure is a binary tree.

16. The PDA having the functional data of claim 15, wherein the binary tree is traversed to generate the optimal route.

17. The PDA having the functional data of claim 13, wherein one or more of the available nodes become available for inspection only when adjacent to a last selected node.

18. The PDA having the functional data of claim 13, further comprising:
a third data structure operable to include a unique identification for the beginning node, the available nodes, and the ending node and operable to include cartographic data associated with each unique identification.

19. The PDA having the functional data of claim 13, wherein the organization of the first data structure decreases a memory requirement associated with generating the optimal route in a navigation device.

20. A method in a PDA of generating a projected route, comprising:
in a PDA, receiving an initial starting location and an ending location;
identifying one or more available locations existing between the starting location and the ending location;
beginning with the stating location and proceeding to the ending location initiating a first evaluation by selecting one or more adjacent locations from the available locations and as one or more of the adjacent locations are selected inserting each of the selected adjacent locations into a first data structure, wherein a first location of the first data structure is always associated with a least cost location of the first data structure, and wherein the first data structure is a treap data structure; and
generating the projected route from the starting location, one or more of the selected adjacent locations which occupy the first location of the first data structure, and the ending location.

21. The method of claim 20, wherein the method further includes providing the projected route to a display of the PDA.

22. The method of claim 20, further comprising:
concurrent with the first evaluation, initiating a second evaluation beginning with the ending location;

proceeding to the starting location and selecting one or more second adjacent locations from the available locations and as one or more of the second adjacent locations are selected;

inserting each of the second selected adjacent locations into a second data structure, wherein a first location of the second data structure is always a least cost location of the second data structure; and detecting when a convergence exists in the first evaluation and the second evaluation and using the first evaluation and the second evaluation in forming the projected route.

23. The method of claim 22, wherein the proceeding with the evaluations occur dynamically as the starting location changes.

24. The method of claim 20, further comprising:

determining the least cost location of the first data structure by determining a time or a distance of travel from a last selected adjacent location to a last least cost location of the first data structure.

25. The method of claim 24, wherein the determining the least cost location includes adding an estimated travel time or distance associated with traveling from the least cost location to the ending location with the time or distance of travel from the last selected adjacent location to the last least cost location of the first data structure.

26. The method of claim 20, wherein in generating the projected route the starting location, one or more of the selected adjacent locations, and the ending location comprise a second data structure.

27. The method of claim 26, wherein generating the projected route includes a binary tree which is the second data structure.

28. The method of claim 20, wherein the method is used in a PDA having Bluetooth capabilities.

29. A personal digital assistant (PDA), comprising:

a calendar function;

an address book function;

a processor operably coupled to a memory and a display;

means for dynamically generating a route path using the processor and the memory from a moveable location associated with the PDA to a destination of the PDA by repetitively dynamically expanding one or more adjacent locations and inserting the adjacent locations into a first data structure wherein one or more first locations of the first data structure are associated with a then existing least cost location in the route path, the route path is dynamically generated from the moveable location, the first locations of the first data structure, and the destination; and means for dynamically communicating at least a portion of the route path to the display.

* * * * *